Patented Feb. 4, 1947

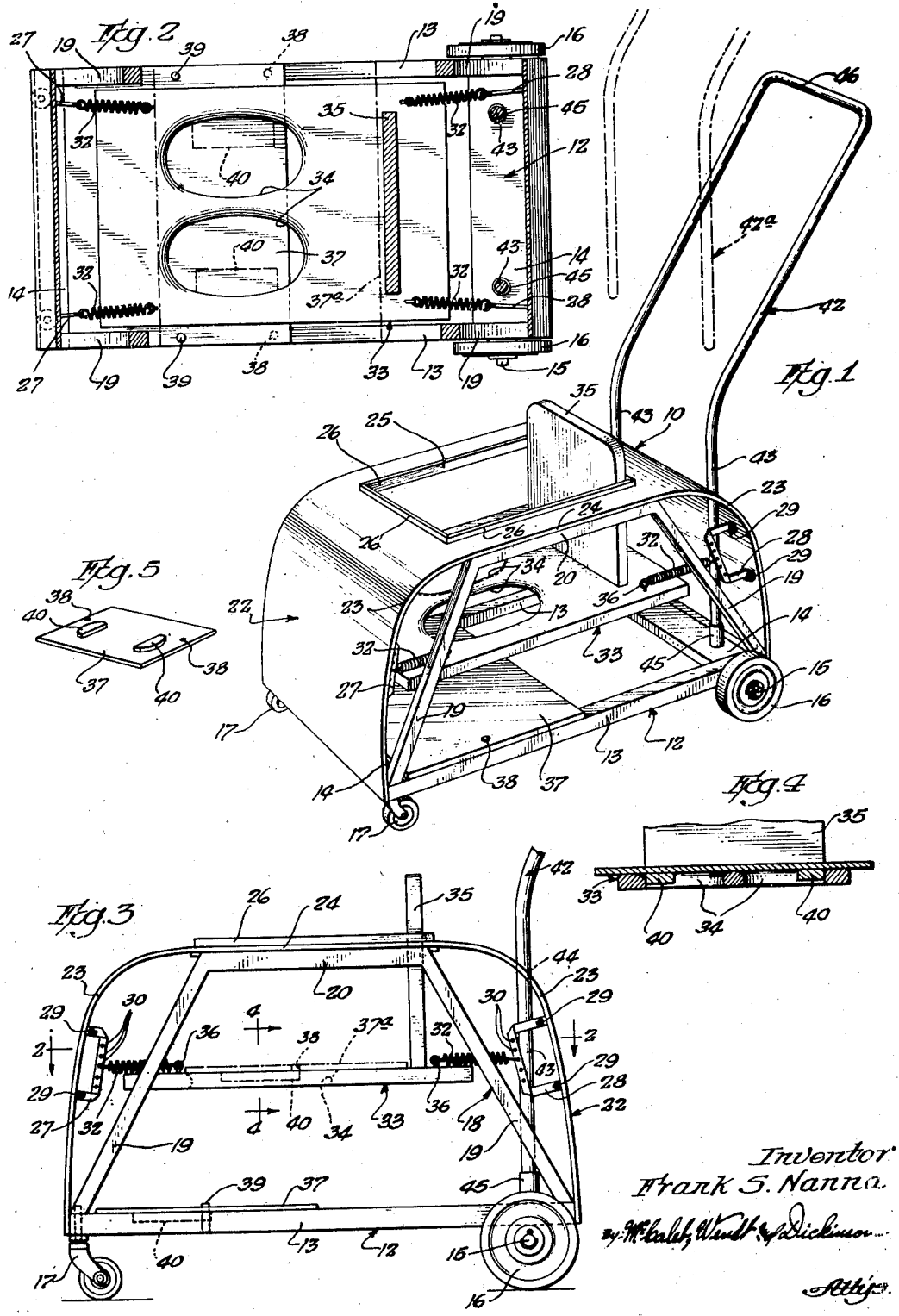

2,415,146

UNITED STATES PATENT OFFICE 2,415,146

BABY WALKER AND STROLLER

Frank S. Nanna, North Lake Village, Ill.

Application March 14, 1945, Serial No. 582,644

7 Claims. (Cl. 280—47)

This invention relates to baby walkers and strollers and more particularly to features of structure of a single device which is quickly and easily convertible to use as either a walker or a stroller.

A general object of the present invention is to provide an improved baby walker which is convertible to use as a stroller.

Another object of the invention is to provide an improved seat suspension for baby walkers and strollers which not only provides the desired resilience and adjustment to suit the size and weight of the child, but also effects greater lateral stability.

The invention also has for an object the provision of a light weight and inexpensive, but sturdy, stable and attractive frame and body structure for a baby walker and/or stroller.

It is an additional object of the invention to provide a baby walker and stroller which is easily convertible from one to the other.

Other objects and advantages of the invention will be apparent from the following description and the accompanying drawing, in which similar characters of reference indicate similar parts throughout the several views.

Referring to the single sheet of drawings:

Fig. 1 is a perspective view of a convertible baby walker and/or stroller embodying my invention in a preferred form;

Fig. 2 is a sectional top view of the structure shown in Fig. 1 with the section taken substantially on a line 2—2 of Fig. 3 and viewed in the direction indicated by the arrows;

Fig. 3 is a side elevational view of the structure shown in Figs. 1 and 2;

Fig. 4 is a fragmentary sectional view of a portion of the structure with the section taken substantially on a line 4—4 of Fig. 2 and viewed in the direction indicated by the arrows; and Fig. 5 is a perspective view of a part of the structure.

Referring to the exemplary embodiment of my invention disclosed in the accompanying drawing, a child's vehicle 10 in its preferred form is quickly and easily convertible for use as either a baby walker or stroller and embodies improved structural features well adapted to either a walker or a stroller or to both. The structure of my baby walker and stroller is such that many of the parts may be made of either metal or wood or other suitable material.

In the structure of the main body of the vehicle, a base frame 12 includes side frame elements 13 and end frame elements 14 secured together in substantially rectangular relation. These side and end frame elements may be made of either wood or metal. At one end the base frame 12 is supported by an axle 15 secured to the lower surface thereof and having wheels 16 rotatably mounted on its projecting outer ends. At the other end the base frame is desirably supported by casters 17, each of which is located near a corner of the frame and rotatable relative to the frame so as to permit turning movement.

At each side of the base frame 12, truncated side frames 18 are secured thereto in substantially co-planar relation with respect to the base frame elements 13. Each of the truncated side frames 18 includes side frame members 19 extending upwardly and inwardly from the ends of the base frame element 13 and connected at their upper ends by a connecting frame element 20. The truncated side frames 18 may be made of either metal or wood.

Extending upwardly from the ends of the base frame 12 and over the tops of the side frames 18, is a panel 22 having curved end portions 23 and a substantially flat top portion 24. The panel is desirably made of wood although it may be made of metal and has its opposite ends secured to the opposite end surfaces of the base frame and its substantially flat top portion secured to the tops of the side frames 18 so that the panel and side frames mutually brace one another to provide a very sturdy and durable structure.

Substantially at the mid-portion of the top of the vehicle, an opening 25 is provided, in the otherwise continuous panel surface, through which a child may be put into the vehicle. Although a rectangular opening is disclosed, it is understood that it may be of some other desired shape. For the protection of the child in using the vehicle, it is desirable that trim strips, such as 26, of greater width than the thickness of the panel and having rounded edges, are secured to the panel around the periphery of the opening.

At each end of the vehicle and spaced above the base frame 12, pairs of brackets 27 and 28 are secured to the inner surfaces of the curved end portions 23 of the panel by suitable fastening means such as bolts 29. These brackets 27 and 28 each have series of vertically spaced holes 30 in which the end of a seat support spring 32 is removably connected at a desired level suitable to the weight and leg length of a child.

A seat 33 having leg openings 34, and desirably having a back rest 35 secured thereto, is resiliently suspended by the springs 32 between the brackets 27 and 28 and below the opening 25.

The ends of the springs 32 opposite those which are connected to the brackets 27 and 28 are secured to the seat by suitable fastening means such as screw eyes 36. The fastening of the spring ends to the seat is desirably on the upper surface of the seat so as to permit free downward movement of the seat without engagement with the springs when the child is placed thereon. Also, to provide more stable support for the seat against forward, rearward or other horizontal swinging movement without undesired rigidity, the springs 32 are normally in tension and are normally disposed in substantially horizontal and opposed relation. When the weight of the child is upon the seat, the inner ends of the springs extend downwardly at an angle and in an amount depending upon the weight of the child, but the springs still exert components of force which resiliently stabilize the seat horizontally as well as supporting it vertically. The back rest 35 is desirably narrower than the opening 25 and set in somewhat from the end of the opening to permit movement thereof without scraping the edges of the opening.

A foot board 37 has holes 38 near opposite edges thereof which fit over dowel pins 39 secured to and projecting from the upper surfaces of the side frame elements 13 removably to hold the foot board in place on the side frame elements below the leg openings 34 when it is desired to keep the child's feet from touching the floor. When used as a walker to be moved about by the child, the foot board 37 is removed.

One step in the conversion of the vehicle from a walker to a stroller, is the placement of the foot board 37 on the side frame elements 13, as shown in Fig. 3, so that although the child's legs extend through the openings 34, its feet are prevented from touching the floor. In the structure illustrated, an alternative step in the conversion to a stroller is the placement of the foot-board 37 on the seat 33, as indicated at 37a in Figs. 2 and 3, to cover the leg openings 34. For holding the foot board in place relative to the seat 33, cleats 40 are provided on the lower surface of the foot board, as shown in Fig. 5, which cleats fit into the leg openings 34 against the outer edges of those openings, as indicated in Figs. 2, 3 and 4. With the foot board 37 placed on the seat 33 over the leg openings 34, the child's legs and feet extend forwardly along the seat.

As another step in the conversion of the vehicle from a walker to a stroller, a handle 42 is removably secured to the vehicle. The handle in the disclosed embodiment has parallel end portions 43 which extend downwardly through holes 44 in the end portion of the panel 22 and have their ends anchored in suitable collars 45 secured to one end frame element 14 of the base frame 12 below the holes 44. The upper portion of the handle is desirably curved rearwardly and has a connecting portion 46 for pushing the vehicle. The panel 22 thus serves as a brace for the handle. To effect removal of the handle when the vehicle is converted to a walker, the handle is withdrawn upwardly, as indicated in dot and dash lines at 42a in Fig. 1.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A baby walker and stroller comprising, in combination, a base frame supported at one end by an axle having wheels thereon, and at the other end by casters, truncated side frames secured to the base frame and each having side members sloping inwardly in one plane toward the top, a panel having a substantially flat top portion and curved end portions extending over the top of the side frames and from end to end of the base frame, said panel having an opening in the top portion, pairs of brackets secured to each end portion of the panel near the sides thereof and at a distance above the base frame, said brackets each having a series of vertically spaced holes therein, a seat having leg openings therein and a back extending upwardly through one end of said opening in the top portion of the panel, said seat being resiliently suspended between said brackets by tension springs, each of said tension springs having one end secured in a hole of one of the brackets and its other end secured to the seat and normally disposed in substantially a horizontal direction between the bracket and seat, a handle detachably connected to one end of the base frame, and a foot board adapted to be detachably mounted on the base frame below the leg openings or on said seat to cover said leg openings.

2. A baby walker comprising, in combination, a base frame, wheel means supporting the base frame, truncated side frames secured to the base frame and each having side members sloping inwardly toward the top, a panel having a substantially flat top portion and curved end portions, said panel extending from one end of the base to the other over the tops of the side frames, said panel also having an opening in the top portion, pairs of brackets secured to each end portion of the panel near the sides thereof and above the base frame, said brackets each having a series of vertically spaced holes therein, a seat having leg openings therein below said opening in the top, and resilient suspension means for said seat, said resilient suspension means including a pair of oppositely disposed tension springs at each side of the seat normally extending horizontally and having their ends secured to the seat and connected in holes of said brackets at a preselected level.

3. In a baby walker and/or stroller, the combination comprising a base frame, means including wheels supporting said base frame, support means above and secured to said base frame, a seat having a relatively flat seating surface with leg openings therein, means resiliently supporting the seat from the support means, a foot board having side apertures therein and cleats on one side thereof, said base having dowels adapted to fit said side apertures removably to hold said foot board in position below said leg openings, and said cleats being spaced to fit said leg openings to hold said foot board in a position covering said leg openings.

4. In a baby walker and/or stroller, the combination comprising a base frame, means including wheels supporting said base frame, support means above and secured to said base frame, a seat having a relatively flat seating surface with leg openings therein, means resiliently supporting the seat from the support means, a foot board adapted to extend across the base frame, means for removably holding the foot board on the base frame in a position below said leg openings, and means for removably holding the foot board in a position on said seat covering said leg openings.

5. In a baby walker and/or stroller, the combination comprising, a base frame, means including wheels supporting said base frame, truncated side frames at each side of said base frame, and a panel having curved end portions and a relatively flat top portion, said panel extending from one end of the base frame to the other and upwardly over the side frames and having an opening in the mid-portion of the relatively flat top portion.

6. In a convertible baby walker and stroller, the combination comprising, a base frame, means including wheels supporting said base frame, a panel having curved end portions and a relatively flat top portion, said end portions being secured to the ends of the base frame and extending upwardly therefrom so that the panel extends over the base frame in spaced relation thereto, a handle having a connecting portion and spaced end portions, means on said base frame for removably holding the ends of said handle inside of said panel, and apertures in one end portion of said panel through which the handle extends so that the panel braces the handle.

7. In a baby walker and/or stroller, the combination comprising a base frame, wheel means supporting the base frame, means providing a substantially smooth top panel having curved end portions extending upwardly from opposite ends of the base frame and a substantially flat top portion, said panel having an opening in the top portion, a seat having leg openings therein disposed below said opening in the top and including a back rest extending upwardly through said opening in the top in spaced relationship thereto, and support means for said seat including resilient suspension means, said suspension means comprising symmetrically disposed pairs of opposed tension springs normally extending horizontally and each having one end secured to the seat.

FRANK S. NANNA.

REFERENCES CITED

The following references are of record in the file of this patent:

UNITED STATES PATENTS

| Number | Name | Date |
|---|---|---|
| 1,326,921 | Dzimitowicz | Jan. 6, 1920 |
| 1,281,921 | Etherington | Oct. 15, 1918 |
| 2,276,792 | Peltier | Mar. 17, 1942 |
| 1,321,564 | Smith | Nov. 11, 1919 |
| 2,355,569 | Smith | Aug. 8, 1944 |
| 2,241,626 | Baxter | May 13, 1941 |
| 348,633 | McFarland | Sept. 7, 1886 |